July 30, 1940.     E. S. GEORGE     2,209,309
LAWN MOWER
Filed Oct. 20, 1938
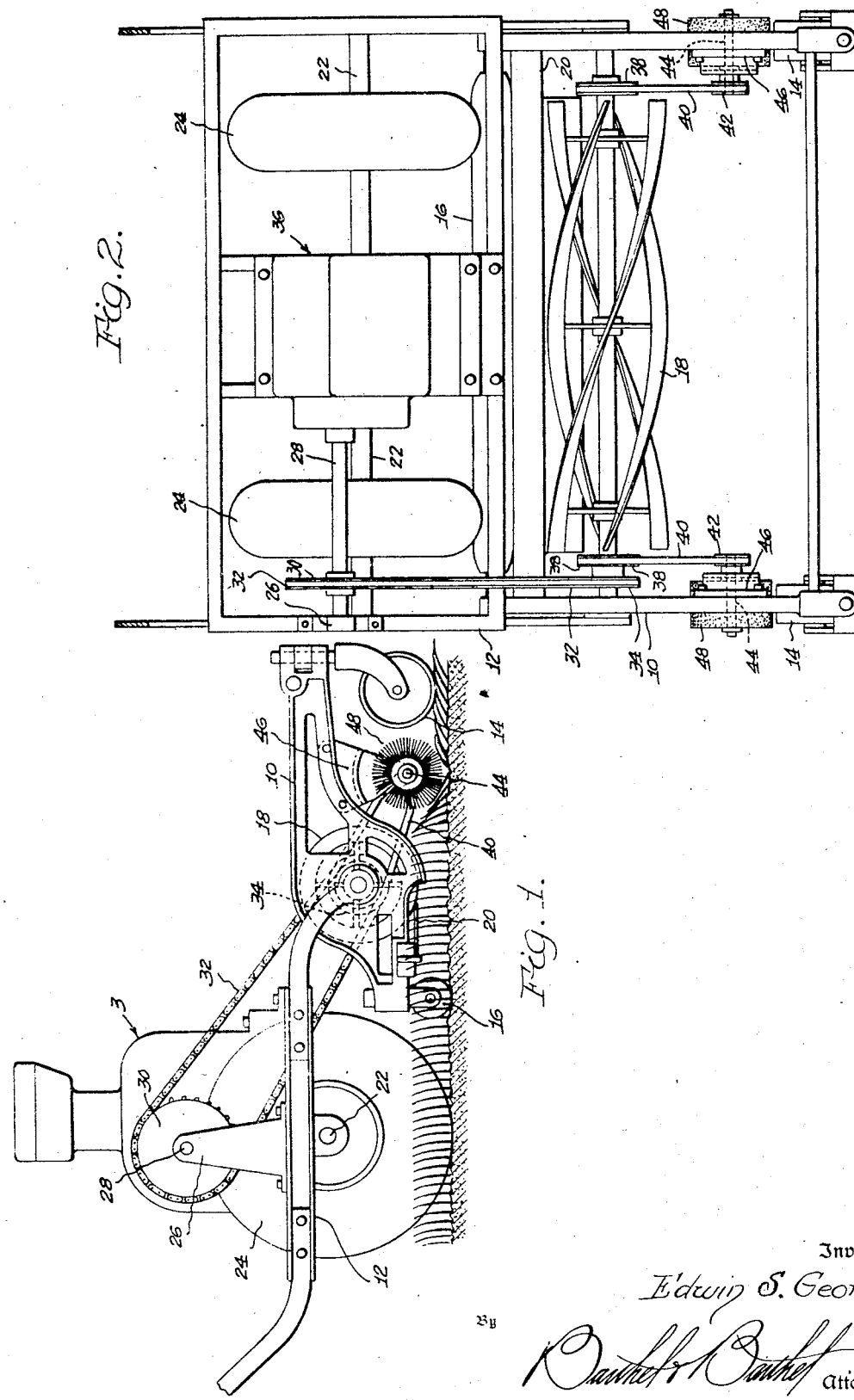
Inventor
Edwin S. George,
By
Barthel & Barthel
Attorney Patented July 30, 1940

2,209,309

UNITED STATES PATENT OFFICE 2,209,309

LAWN MOWER

Edwin S. George, Bloomfield Hills, Mich., assignor to The Moto-Mower Company, Detroit, Mich., a corporation of Michigan Application October 20, 1938, Serial No. 235,953

2 Claims. (Cl. 56—26)

This invention relates, in general, to improvements in lawn mowers and, in particular, to mowers of the comparatively heavy duty type.

One fault inherent in the use of heavy duty mowers for mowing on a large scale is the leaving of uncut grass in the tracks caused by the rolls, wheels or casters of the mower. Therefore, to correct for this, the main object of the invention is to improve a lawn mower so that the grass tracked down by the ground-bearing members of the mower is as uniformly cut by the cutting members of the mower as is the lawn as a whole.

More specifically, an object of the invention is to provide a lawn mower with mechanical means whereby the grass tracked down by the ground-bearing members of the mower is upraised to permit uniform cutting thereof by the cutting members of the mower.

Other objects and advantages of the invention will become readily apparent from a reference to the following specification taken in conjunction with the accompanying drawing in which:

Figure 1 is a side elevation of a mower and showing details of the invention incorporated therein; and Fig. 2 is a plan view of the showing in Fig. 1.

The mower of Figs. 1 and 2, which may be of the form shown in my co-pending application, Serial No. 213,380, filed June 13, 1938, and entitled "Lawn mower," comprises fore and aft frame structures 10 and 12 of the usual construction and which are hinged, pivoted, or otherwise interconnected for the ordinarily desirable relative movement therebetween. As is customary, the fore frame structure 10 supports at or near its forward end a pair of spaced, ground-engaging wheels or casters 14 adapted for swivelled movement relatively to said structure and at or near its rearward end a ground-engaging roller 16. As is also customary, a cutting reel 18 is rotatably carried by the frame structures 10 and 12 at the interconnection thereof, said reel being supported ahead of and in close proximity to the usual cutting bar 20 carried by the frame structure 10 ahead of the roller 16, said reel also being disposed behind the wheels or casters 14 and therebetween.

The aft frame structure 12 of the mower is shown, as usual, supporting a shaft 22 on which is mounted intermediate its ends and for rotation therewith a pair of spaced, ground-engaging wheels 24. A boss 26 is provided on one side of the frame structure 12 and forms a bearing for one end of a shaft 28 on which is mounted for rotation therewith a pulley or sprocket wheel 30. Pulley or wheel 30 is operable for driving the cutting reel 18 by means of a belt or chain drive 32 which is in driven connection with the pulley or sprocket wheel 30 and in driving connection with a pulley or sprocket wheel 34 mounted on and for rotation with said reel at one side of the cutting members thereon.

For driving the mower itself and the reel 18 thereof, a power plant, generally indicated at 36, is shown for the purpose of illustration and is supported by the aft frame structure 12 between the wheels 24. The power plant 36 may be an electric motor, an internal combustion engine, or any other power means whereby the mower is moved across the lawn to be cut and the reel is positively rotated to perform such cutting. As shown, however, the power plant 36 is in operative association with the shafts 22 and 28 for driving same, preferably individually, appropriate clutches and other mechanical connections (not shown) being provided between the proper working parts of the plant 36 and the independent and individual shafts 22 and 28, so that rotation of shaft 22 will carry the mower on the wheels 24 across the lawn to be cut, and rotation of shaft 28 will rotatably drive the reel 18 through the belt or chain drive 32 and the pulleys or sprocket wheels 30 and 34.

Fixedly mounted on the shaft or axle of the cutting reel 18 for rotation therewith is a pair of sprockets or pulleys 38 which are disposed on said shaft or axle outwardly of each end of the cutting portion of said reel. In driven connection with each sprocket or pulley 38 is a chain drive or belt 40 which, in turn, is in driving connection with a sprocket or pulley 42. Driven sprockets or pulleys 42 are fixedly supported in alignment with their driving sprockets or pulleys 38 on the inner ends of shafts 44 which are journalled in bearing portions 46 formed or mounted on the fore frame structure 10. Also mounted on the shafts 44 for rotation therewith, outwardly of the sprockets or pulleys 42 and adapted for being disposed just rearwardly of the wheels or casters 14, are brushes 48. Each of the brushes 48 has a width at least as great as the width of the wheel or caster 14 disposed thereahead and a disposition slightly below the reel 18 so that the grass crushed or tracked down by the wheels or casters 14 during travel of the mower over the lawn is readily and entirely replaced into a substantially vertical position by said brushes so as to permit the subsequent and uniform cutting thereof by said reel. Since the wheels or casters 14 are the only ground-engaging members of the ordinary mower which lead and, at the same time, laterally overlie the reel 18, only two brushes 48 are shown, but it is readily apparent that any other laterally overlying, ground-engaging members of the mower, whether they lead or follow the reel 18, may be similarly provided with said brushes. It is also contemplated that brushes 48 will be adapted in some known manner for adjustment toward and from the ground.

Although the invention has been described with some detail, it is not intended that such description is to be definitive of the limits of the inventive idea. The right is reserved to make such changes in the details of construction and arrangement of parts as will come within the purview of the attached claims.

What I claim is:

1. In a power lawn mower, a frame, a motor thereon, an elongated cutter carried by said frame, cutter driving mechanism operatively connecting said cutter with said motor, a pair of spaced ground wheels mounted on opposite sides of said frame beyond the outer ends of said cutter and outside the cutting path thereof, a pair of spaced rotary brushes mounted in engagement with the lawn behind and in the path of said pair of ground wheels, and spaced power connections on opposite sides of said frame extending from said cutter driving mechanism to said brushes and operatively connecting each brush with said cutter driving mechanism; whereby the spaced ground wheels support the mower while leaving the grass untrampled in front of the cutter, whereas the grass trampled by the ground wheels is immediately restored by the power driven brushes thereof.

2. In a power lawn mower, a frame, a motor thereon, an elongated cutter carried by said frame, cutter shaft means on said frame operatively connected to said cutter for actuating said cutter, cutter driving mechanism operatively connecting said motor with said cutter shaft means, a pair of spaced ground wheels mounted on opposite sides of said frame beyond the outer ends of said cutter and outside the cutting path thereof, a pair of spaced rotary brushes mounted in engagement with the lawn behind and in the path of said pair of ground wheels, and spaced power connections on opposite sides of said frame extending from said cutter shaft means to said brushes and operatively connecting each brush with said cutter shaft means, whereby the spaced ground wheels support the mower while leaving the grass untrampled in front of the cutter, whereas the grass trampled by the ground wheels is immediately restored by the power driven brushes thereof.

EDWIN S. GEORGE.